Jan. 9, 1951 F. V. KENNEDY 2,537,273
BRAKE CYLINDER PROTECTION VALVE
Filed Sept. 11, 1946 2 Sheets-Sheet 1

Inventor
FLOYD V. KENNEDY
By
Smith & Wells
Attorney

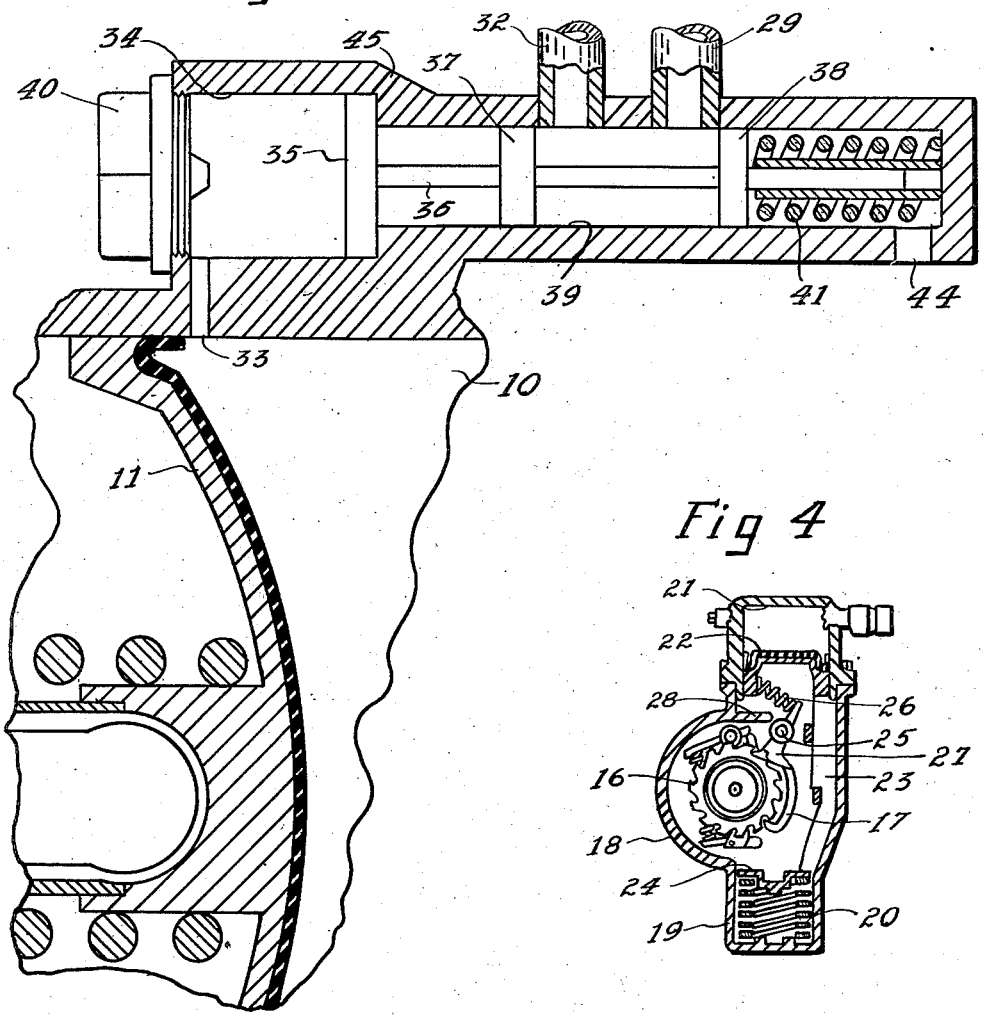

Patented Jan. 9, 1951

2,537,273

UNITED STATES PATENT OFFICE 2,537,273

BRAKE CYLINDER PROTECTION VALVE

Floyd V. Kennedy, St. Maries, Idaho

Application September 11, 1946, Serial No. 696,293

1 Claim. (Cl. 188—203)

My invention relates to improvements in a brake cylinder protection valve.

It is the principal purpose of my invention to provide means in the form of a protection valve, integral with the brake cylinder, or directly on it, to avoid a present hidden danger very difficult of detection, on railway cars equipped with air brakes and with the common automatic slack adjuster.

Efficient retardation or holding by air or hand brakes on railway cars depends upon maintenance of the proper slack in the brake foundation gear on such cars. During use of brakes the brake shoes wear down, and other parts of the levers and rods wear and readjust from time to time, such changes require a pretty constant readjustment of the slack action in brake rigging to be assured of the maximum braking efficiency. On freight cars this is done manually by repair men located at terminals or inspection points, but on passenger cars the predetermined slack action permissible is maintained by the action of the automatic slack adjuster which acts when the slack exceeds the established maximum allowance for that car.

The railroads operate many types of passenger cars, many of them antiquated, others of a modern design. Some cars are equipped with one brake cylinder, others have two, and the more modern types have four or eight cylinders. Each cylinder is equipped with an automatic slack adjuster. This slack adjuster consists of a long screw arrangement, one end of which is attached to the brake rigging, and to the other end is attached a ratchet wheel which is a component part of the slack adjuster engine. This engine consists of a piston for receiving the propelling air pressure, a hook or dog which engages the ratchet wheel when the piston is forced out, and a spring which forces the piston back to normal position and thereby turns the ratchet wheel one notch when the release of air brake is made. One such action takes up $\frac{1}{32}$ of an inch travel on the brake piston. Too much slack action in the brake foundation gear results in excessive brake-cylinder piston travel inasmuch as such travel is restricted only by the resistance encountered in the brake rigging on the car, therefore, the visible travel of the piston on a car serves as an accurate indicator regarding the condition of the slack prevailing in the brake rigging on that particular car.

The manufacturer determines the amount of slack action desirable and the maximum amount of brake-cylinder piston travel permissible to maintain the predetermined braking ratio for the car involved. When he has determined the maximum piston travel to be allowed before slack is to be taken up, he uses this measurement for establishing an opening in the brake cylinder wall to which the automatic-slack-adjuster pipe is to be attached. For example, if 5 inches is established as the maximum piston travel, the opening in the cylinder wall is set 5 inches from the pressure end of the cylinder. Obviously, there will be no pressure transmitted to the automatic slack adjuster if the slack in the brake rigging is kept up to the point to preclude the brake piston traveling as much as 5 inches as the port in cylinder wall will not be uncovered under such circumstances.

Generally air-brake cars are equipped with air reservoirs and triple valves. It is the function of the triple valve to automatically respond to the action of the engineer's brake valve and charge the brakes (i. e., all reservoirs and brake pipes) apply the brakes, and release them. When the engineer makes a reduction in the trainpipe air pressure this results in an action of the triple valve which shunts air pressure from one or both of the reservoirs to the brake cylinders; this forces out the brake pistons and forces the brake shoes against the wheels of the car. Each car is provided with a reservoir for so-called "service" application of the brakes, and also an additional reservoir to conserve pressure for an emergency application of the brakes if such be required. The triple valve also functions to give this emergency application when needed. On most passenger cars an emergency application of the brakes is available even though the service application may have been made, or may be in process. In any event the crucial point in all these intricate arrangements is the delivery of air pressure to the brake cylinder as it is here that the final force of retardation must be applied. To detract in any way from this calculated pressure results in impaired braking efficiency.

Under the present accepted method of piping air pressure to the brake cylinders and the slack adjuster engine, the air pressure required for propulsion of the slack adjuster engine is in reality the same volume that delivers pressure to the brake piston. The pipe leading to the slack adjuster engine becomes a common chamber with the brake cylinder when the slack action in the brake rigging allows the brake piston to pass the port in the cylinder wall. This slack adjuster pipe has connections at either end which may become loose, or the pipe may become ruptured, It is obvious that such an occurrence will at once impair the braking efficiency as the entire pressure will dissipate within 40 to 90 seconds. This potential defect should be eradicated from the air brake system on each and every car.

The nature of the defect and the resultant action on the brake piston and the brake shoes will, in most cases, create a dangerous deception to the car repairman who makes inspections at certain points. Inspectors usually begin their tour at either end of the train and work toward the opposite end of train. Unless the car on which the defect prevails is near the end of the train the entire blow-down of pressure will have occurred before the inspector will have reached the car, therefore, there will be no audible sound from the ruptured point in the pipe. Furthermore, as the blow-down progresses the brake cylinder return spring will force the brake piston back toward release position but when the opening in the cylinder wall is blanked by the returning piston the air pressure still retained in the cylinder will cushion the piston to a stop when the compressed air pressure equals the spring tension on the opposite side of the cylinder piston. When this occurs this piston will remain extended, and so will all other pistons on the car inasmuch as the blow-down was depleting the reservoir supply on which all cylinders are dependent for pressure. Also, the brake shoes will remain against the car wheels, so that a visible inspection of the brakes will not disclose the defect. The slightest push against the brake shoes may result in their falling away from the wheels, but it is not customary to apply physical force in making a train inspection. Therefore, it is entirely possible that a car may travel through inspection point after inspection point without being discovered as defective. The defect is, therefore, unusually serious inasmuch as it evades discovery and saps the pressure supply at the very point of culmination of applied force.

The invention contemplates means whereby bleeding of air from the brake cylinder or cylinders through the slack adjuster controlling port in the brake cylinder due to breaks, cracks, leaks, or any disconnection in the pipe or pipes supplying air to the slack adjuster motor is always prevented. The brake cylinder port still controls the operation of the slack adjuster but does so upon a predetermined measured charge of air which is of such small volume as not to adversely affect the operation of the brakes.

More particularly it is a purpose of my invention to interpose over the brake cylinder port that controls the slack adjuster, an air operated valve that in turn controls the air supply to the slack adjuster engine, the air for said valve being supplied from the brake cylinder at said port and exhausted through said port, there being no other exhaust for said air and there being no piping interposed that might become broken, cracked or disconnected.

The novel features that I consider characteristic of my invention are set forth with particularity in the claims. The invention itself, however, both as to its organization and its method of operation, together with additional objects and advantages thereof, will be understood from the description of a specific embodiment when read in connection with the accompanying drawings, in which:

Figure 3 is an enlarged sectional view through the protection valve and a portion of the brake cylinder showing the parts as they are positioned when air is being supplied to the slack adjuster engine for taking up slack; and Figure 4 is a detail sectional view illustrating generally the construction of the slack adjuster engine.

Figure 1:
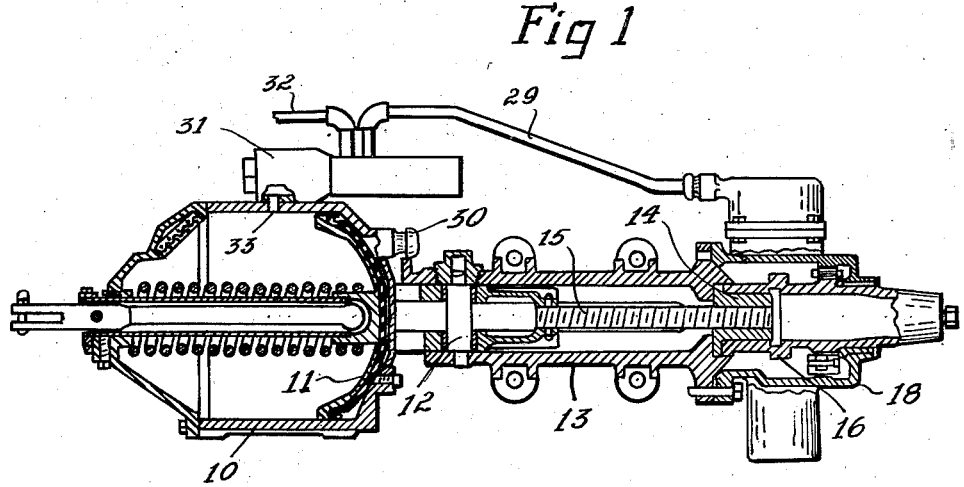
Figure 1 is a fragmentary view partly in section of a brake cylinder and slack adjuster assembly of a common type now employed on cars equipped with air brakes and showing my improved brake cylinder protection valve applied thereto.

Referring now in detail to the drawings, no attempt has been made to show the details of a brake system embodying an air brake cylinder and slack adjuster since these parts form no part of my invention. The mechanism hereinbefore described as general equipment in railway car brakes is well known and should need no illustration. The essential parts that are affected by my invention are shown generally in Figure 1 of the drawings. In this figure the brake cylinder is indicated at 10, the piston in the brake cylinder is indicated at 11. A known slack adjuster mechanism is connected to the brake cylinder by a coupling 12, the mechanism being housed in a shell 13 which is suitably mounted on the car. The adjuster mechanism comprises a head 14 in which a screw 15 is threaded. This screw is attached to the coupling 12 and by turning the head 14 the coupling 12 can be moved lengthwise within the housing 13 to adjust the slack in the brake rigging in the well-known manner.

The element 14 is rotated by a ratchet wheel 16 which in turn is actuated by a pawl 17 whose movements are controlled by the slack adjuster engine. One form of slack adjuster engine is illustrated in Figure 4 of the drawings where the ratchet wheel 16 is shown as mounted in a housing 19 that is bolted to the housing 13. This housing has a spring well 19 seating a spring 20 and has a cylinder 21 which receives a piston 22. The piston is connected by a connecting bar 23 to a spring follower 24 so that when the piston 22 is depressed the spring 20 is compressed. The pawl 17 is pivoted at 25 to the piston assembly and is normally pressed toward the ratchet wheel 16 by a spring 26. In the position shown in Figure 4 the piston has been lowered to compress the spring 20 and the pawl is in engagement with the teeth of the ratchet wheel 16. Upon release of air from the cylinder 21, the spring 20 will move the piston 22 upwardly which in turn will cause the pawl 17 to rotate the ratchet wheel 16 counter-clockwise, which is the direction necessary to take up the slack in the brake rigging to prevent over travel of the brake piston 11.

A lifting cam 27 is formed on the pawl 17 and this cam is adapted to engage a projection 28 to lift the pawl away from the ratchet wheel after a predetermined amount of travel. The slack adjuster mechanism can also be operated manually when that is desired.

According to the present invention, air is supplied to the cylinder 21 through a pipe 29. Air is supplied to the brake cylinder through a connection indicated at 30. The pipe 29 leads to my brake cylinder protection valve 31 which is welded or integrally formed on the casing of the brake cylinder 10. A supply pipe 32 connects to the valve 31 at a point adjacent to the connection of the pipe 29. In the normal operation of an air brake system, the slack adjuster engine does not operate. However, when the slack in the brake system reaches such a point that in order to apply the brakes the piston 11 must move beyond a certain limit, it is necessary to take up the slack. This limit of piston travel is such that it will uncover a port 33 in the brake cylinder and through the medium of this port control the supply of air to the slack adjuster cylinder to operate the piston 22. Customarily today it is the practice to allow the air to flow from the port 33 through the pipe 29 to the slack adjuster engine. In other words, the slack adjuster engine is operated from air taken from the cylinder. It has heretofore been proposed to take the air for the slack adjuster engine from some other part of the air pressure system, but these devices of which I am aware do not make any attempt to eliminate the hazard which has been referred to hereinbefore in the first part of the specification. In other words, the danger of draining air from the brake cylinder was not eliminated and this is the important factor in that it causes the failure of the brakes as disclosed hereinbefore.

Figure 2:
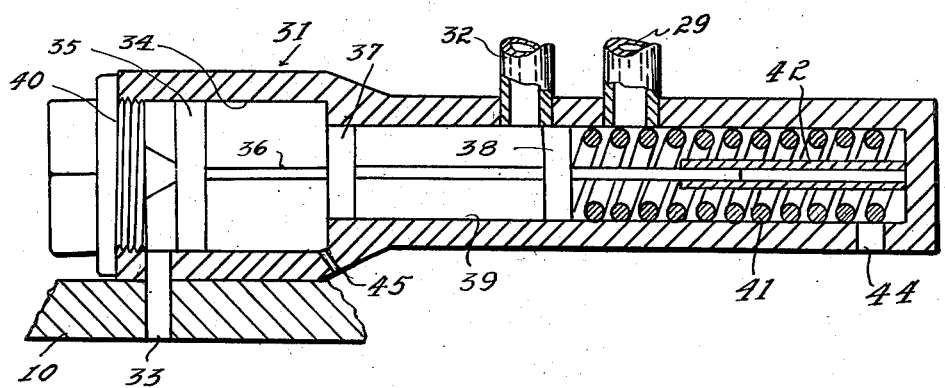
Figure 2 is an enlarged sectional view taken longitudinally through the protection valve showing the normal position of the parts when no air is being supplied to the slack adjuster engine.

In the present invention the valve 31 includes a cylinder portion 34 that is positioned directly over the port 33. This cylinder portion is either welded or cast integral with the brake cylinder or is otherwise affixed on the brake cylinder so that there is no possibilty of leakage in the connection between the cylinder of the valve and the brake cylinder. A piston 35 is mounted in the cylinder 34 and has a rod 36 on which two smaller pistons 37 and 38 are secured. These smaller pistons work in a cylinder portion 39 of reduced diameter that is integral with the portion 34 of the valve 31. The pistons 37 and 38 control the passage of air from the supply pipe 32 to the pipe 29 that supplies air for operating the engine of the slack adjuster. The pistons 35, 37 and 38 are so spaced and arranged that when in the position shown in Figure 2, the air supply pipe 32 opens into the space between the pistons 37 and 38 and this space is sealed against escape of the air in either direction. However, when the parts are positioned as shown in Figure 3 of the drawings, the piston 11 of the brake cylinder has cleared the port 33 so that the air in the brake cylinder is applied through this port to move the piston 35 to the right thus bringing the two pipes 32 and 29 into communication between the pistons 37 and 38.

The cylinder 34 is closed by a stop plug 40 which is normally sealed when it is applied. The opposite end of the cylinder 39 has a spring 41 mounted therein and a guide sleeve 42 is provided for the end of the rod 36. A bleed opening 44 is provided so that the air to the right of the piston 38 can escape. A small bleed opening 45 is also provided at the right hand end of the cylinder 34 to maintain atmospheric pressure on the right hand side of the piston 35.

The cylinders 34 and 39, the pistons 35, 37, and 38 and the spring 41 form a differential valve in which the spring pressure opposes the piston 35 and must be overcome by the admission of air through the port 33 from the brake cylinder in order to supply operating air to the slack adjuster engine. The operating air is drawn from the air supply system and is not taken from the brake cylinder itself. However, every time the brake piston 11 is allowed to move far enough past the port 33 to uncover it, a limited amount of air is taken from the brake cylinder to actuate the piston 35, and of course when the piston 11 works to the right upon release of the brakes the port 33 is uncovered on the atmospheric side of the piston 11 thus permitting the air to escape from the cylinder 34 in order that the spring 41 can return the parts to the position shown in Figure 2 and establish an exhaust outlet for the pipe 29 through the space around the spring 41 to the opening 44. This operates the slack adjuster to take up some of the slack in the brake rigging. If the one operation of the slack adjuster is not sufficient to prevent the piston 11 from uncovering the port 33 on its next stroke the slack adjuster will again be operated until finally the travel of the piston 11 in setting the brakes is less than the necessary travel to uncover the port 33.

It is evident that any break in the pipe 29 or the pipe 32 or in their connections to the valve 31 will have no effect on the escape of air from the brake cylinder. In order to allow air to escape from the brake cylinder through the port 33 the valve 31 must itself be broken in some fashion and this of course would be evident by simple inspection. By mounting the valve 31 by welding or by casting it on the brake cylinder, possibility of any leak between the brake cylinder and the valve is eliminated. This way I have overcome the danger that has heretofore existed in the customary installation of a slack ajuster engine so that it is operated from air supplied through the port 33 from the brake cylinder. My invention is not limited to any particular type of valve 31. It is essential of course, that it be a differential valve with some means of returning the piston 35 to the position shown in Figure 2 when the port 33 is open to atmosphere.

It is believed that the nature and advantages of the invention will be clear from the foregoing description. Having thus described my invention, I claim:

The combination with the brake cylinder and piston and pneumatic slack adjuster of an air brake system for railway cars, of means utilizing control air from the pressure side of the brake cylinder piston for connecting operating air from a separate source to the slack adjuster, said means comprising a cylinder and valve body integral with the brake cylinder, a port leading from the interior of the brake cylinder to the interior of the cylinder and valve body at one end of said body, a piston movable in said body toward and away from the port and sealing off that part of the interior of the body over the port so that air entering the body through said port from the brake cylinder must return through the port to escape, a differential valve mechanism in said body on the opposite side of the piston from the port and secured to said piston, and an air supply conduit to the body and from the body to the slack adjuster through the differential valve mechanism.

FLOYD V. KENNEDY.

REFERENCES CITED

The following references are of record in the file of this patent:

UNITED STATES PATENTS

| Number | Name | Date |
| --- | --- | --- |
| 1,055,444 | Cass | Mar. 11, 1913 |
| 2,068,973 | Booth | Jan. 26, 1937 |
| 3,152,715 | Van Cleave | Apr. 4, 1939 |
| 2,282,472 | Herman et al. | May 12, 1942 |